US010425015B2

(12) United States Patent
Armschat et al.

(10) Patent No.: US 10,425,015 B2
(45) Date of Patent: Sep. 24, 2019

(54) CONVERTER ARRANGEMENT HAVING A STAR POINT REACTOR

(71) Applicant: SIEMENS AKTIENGESELLSCHAFT, Munich (DE)

(72) Inventors: Christoph Armschat, Erlangen (DE); Andre Schoen, Erlangen (DE); Dag Soerangr, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/098,195

(22) PCT Filed: May 4, 2016

(86) PCT No.: PCT/EP2016/060061
§ 371 (c)(1),
(2) Date: Nov. 1, 2018

(87) PCT Pub. No.: WO2017/190782
PCT Pub. Date: Nov. 9, 2017

(65) Prior Publication Data
US 2019/0165692 A1 May 30, 2019

(51) Int. Cl.
*H02M 7/219* (2006.01)
*H02M 1/088* (2006.01)
(Continued)

(52) U.S. Cl.
CPC ............ *H02M 7/219* (2013.01); *H01F 27/24* (2013.01); *H01F 27/28* (2013.01); *H01F 30/06* (2013.01); *H02M 1/088* (2013.01); *H02M 1/12* (2013.01)

(58) Field of Classification Search
CPC ........ H02M 7/219; H02M 1/12; H02M 1/088; H01F 27/28; H01F 30/06; H01F 27/24
See application file for complete search history.

(56) References Cited

U.S. PATENT DOCUMENTS 5,663,636 A * 9/1997 Falldin ...................... H02J 3/01
323/356
7,489,485 B2 * 2/2009 A F Klercker Alakula ...............
H01F 27/38
361/35

(Continued)

FOREIGN PATENT DOCUMENTS

DE 10042283 A1 3/2002
DE 102009034354 A1 1/2011
(Continued)

*Primary Examiner* — Kyle J Moody
(74) *Attorney, Agent, or Firm* — Laurence Greenberg Werner Stemer; Ralph Locher

(57) ABSTRACT

A converter arrangement has a converter which can be switched between an AC network and a DC voltage circuit and which has power semiconductor valves that extend between AC voltage connections and DC voltage connections. Each power semiconductor valve has a series connection of bipolar submodules that in turn include power semiconductor devices. The arrangement further includes a star point reactor which is arranged on the AC voltage side of the converter and has impedance coils that are connected to a grounded neutral point. In order to better balance the voltages in the DC circuit, the impedance coils have a common coil core.

9 Claims, 4 Drawing Sheets

(51) Int. Cl.
    *H02M 1/12*      (2006.01)
    *H01F 27/24*     (2006.01)
    *H01F 30/06*     (2006.01)
    *H01F 27/28*     (2006.01)

(56) References Cited

U.S. PATENT DOCUMENTS

| | | | |
|---|---|---|---|
| 7,535,125 B2* | 5/2009 | Shudarek | H03H 7/427 |
| | | | 307/105 |
| 7,629,786 B2* | 12/2009 | Lee | H02J 3/01 |
| | | | 307/105 |
| 7,960,871 B2* | 6/2011 | Dommaschk | H02M 7/483 |
| | | | 307/151 |
| 8,994,232 B2 | 3/2015 | Armschat et al. | |
| 2012/0256719 A1* | 10/2012 | Shudarek | H02J 3/01 |
| | | | 336/179 |
| 2014/0139167 A1* | 5/2014 | Steimer | H02M 1/126 |
| | | | 318/494 |
| 2017/0077799 A1* | 3/2017 | Wang | H02M 1/12 |
| 2017/0324333 A1* | 11/2017 | Xiao | H02M 1/12 |
| 2017/0331448 A1* | 11/2017 | Dalessandro | H01F 27/025 |
| 2018/0108472 A1* | 4/2018 | Pagenkopf | H01F 17/062 |

FOREIGN PATENT DOCUMENTS

| | | |
|---|---|---|
| EP | 1855366 A2 | 11/2007 |
| WO | 2005109593 A1 | 11/2005 |
| WO | 2011006796 A2 | 1/2011 |

\* cited by examiner

CONVERTER ARRANGEMENT HAVING A STAR POINT REACTOR

BACKGROUND OF THE INVENTION

Field of the Invention

The invention relates to a converter arrangement having a converter, which is switchable between an AC network and a DC voltage circuit and has power semiconductor valves, which extend in each case between an AC voltage connection and a DC voltage connection, wherein each power semiconductor valve comprises a series circuit of two-pole submodules, which comprise power semiconductors, and a star point reactor, which is arranged on the AC-voltage side of the converter and has inductor coils, which are interconnected to form a grounded neutral point.

Such a converter arrangement is known from DE 10 2009 034 354 A1. The known converter arrangement is used for making it possible to transmit electrical energy between an AC network and a DC voltage power supply system. For this purpose, the converter is connected to the DC voltage circuit or a DC voltage line by means of the DC voltage connection and to the AC network by means of the AC voltage connection. In this case, the converter arrangement can be part of a high-voltage DC transmission (HVDC transmission) system, for example. The converter of the known converter arrangement is a so-called modular multi-level converter (MMC). Each power semiconductor valve of the MMC comprises a series circuit of two-pole submodules. In turn, the submodule comprises power semiconductor switches and an energy store, usually in the form of a capacitor. The power semiconductor switches are interconnected with the energy store in such a way that, by suitable control of the power semiconductor switches, a voltage zero or an energy store voltage drop across the energy store can be generated at the poles or terminals of the submodule. The power semiconductor switches and the submodules are controllable independently of one another, with the result that a stepped AC converter voltage can be generated by means of the MMC on the AC-voltage side, with the step level of said stepped AC converter voltage being determined substantially by the energy store voltage and the number of steps which can be generated being determined by the number of submodules of the power semiconductor valve. Owing to the design and mode of operation of the MMC, poles of the DC voltage circuit may have, in principle, voltages with varying magnitudes, with respect to the ground potential. In particular in an embodiment as a so-called symmetrical monopole, there is no solid link of the converter or the DC voltage circuit to the ground potential. In such a case, surface currents which flow away to ground on the surfaces of insulators effect a resultant direct current to ground. This resultant direct current can have a disadvantageous effect on the AC-voltage side of the converter. The star point reactor of the known converter arrangement is intended to balance the voltages in the DC voltage circuit with respect to the ground potential. For this purpose, the inductor coils are configured in such a way that they represent, for alternating current at a fundamental frequency of the AC network, a current path with a high impedance to the ground potential. Likewise, the inductor coils form, for a direct current, a current path with a low impedance to the ground potential. In this way, a potential link of the converter arrangement to the ground potential is realized. The star point reactor is in this case arranged in parallel with the AC network between the converter and a transformer on the AC-voltage side.

Each inductor coil of the star point reactor is connected, or is connectable via a switching unit, to a phase, assigned thereto, of the AC network on the side remote from the neutral point. The alternating currents at the fundamental frequency of the AC network (generally this fundamental frequency is 50 Hz or 60 Hz) cannot flow away via the star point reactor. The direct currents produced as a result of an asymmetry in the voltages in the DC voltage circuit can, on the other hand, flow away via the star point reactor and thereby balance said star point reactor.

The article by O. Samuelsson "Power Transformer immune to Geomagnetically Induced Currents", IEEE 2013, discloses an arrangement of a transformer in which the influence of the resultant direct currents on the magnetization of the transformer is reduced by means of compensation windings.

The object of the present invention consists in proposing a converter arrangement of the appropriate type in which further improved balancing of the DC voltage circuit is possible.

SUMMARY OF THE INVENTION

In the case of a converter arrangement of the appropriate type, the object is achieved by virtue of the fact that the inductor coils have a common coil core.

Accordingly, the inductor coils have a common coil core passing through them, suitably consisting of a ferromagnetic material, for example of iron. The inductor coils can be in the form of a transformer without a secondary winding, for example. The coil core is expediently multi-limbed, correspondingly three-limbed in the case of a three-phase AC network.

One advantage of the present invention consists in the fact that a positive-sequence network inductance of the alternating currents of the individual phases of the AC network with respect to the neutral point is formed by the common coil core. The magnetic flux in the common coil core adds up to zero in the case of a symmetrical AC voltage system. Owing to the magnetic coupling, accordingly the impedance for the positive-sequence network is markedly increased, and the positive-sequence network inductance effectively limits the alternating current of the fundamental frequency.

An additional advantage results from an increased current loading capacity of the star point reactor of the converter arrangement in accordance with the invention with respect to direct currents.

The magnetically coupled inductor coils can furthermore be accommodated with one another in a common housing, as a result of which a particularly compact design of the star point reactor is produced. In addition, in this case it is possible to provide the insulation by means of oils or esters in the common housing.

Preferably, each inductor coil has a subcore, assigned thereto, of the common core passing through it, wherein each subcore delimits an air gap. In this case, the air gap is in each case dimensioned such that each inductor coil has a predetermined inductance and a predetermined saturation point given a preset converter direct current. Accordingly, air gaps are introduced into the subcores of the common coil core in a targeted manner. By means of the associated air gap or the width thereof, a saturation point of the inductor coil can be controlled correspondingly in a targeted manner. This advantageously allows for a defined saturation point (also referred to as saturation kink) in the inductance of the inductor coil to be set, as is advantageous, for example, in the case of a fault condition in the converter arrangement.

The saturation point relates to a representation of the dependence of the time integral of the voltage Φ on the DC current IDC at which the saturation point indicates a rapid change ("kink") in the inductance L=ΔΦ/ΔIDC in the range between an unsaturated inductance L1 in the case of low direct currents and a saturated inductance L2 in the case of high direct currents. Generally, the unsaturated inductance L1 is higher than the saturated inductance L2. In this way, both a predetermined unsaturated inductance of the inductor coil during normal operation and a saturated inductance in the event of a fault can be realized in a targeted manner. In particular, a low inductance in the event of a fault, for example in the event of an asymmetrical ground fault in the DC voltage circuit, may be advantageous since, as a result, comparatively short decay times for the fault current can be achieved.

Preferably, the converter arrangement additionally comprises a zero-sequence network inductor, which is arranged between the neutral point and the link to ground. This zero-sequence network inductor can be provided with a ferromagnetic core, preferably an iron core. In addition, the iron core can have an air gap, which enables targeted fixing of the inductance and the saturation point of the zero-sequence network inductor. The zero-sequence network inductor is provided for the purpose of limiting the rate of rise of the zero-sequence network current through the star point reactor. In addition, currents which are caused by a third harmonic of the alternating current can likewise be suppressed by means of the zero-sequence network inductor. Such a third harmonic on the fundamental frequency is often generated in order to achieve a reduction in the insulation levels in the converter arrangement. A high impedance with respect to such a third harmonic of the AC voltage can be achieved by means of the zero-sequence network inductor.

The star point reactor can be arranged, for example, between a transformer, which is arranged on the AC-voltage side of the converter, and the AC voltage connection of the converter. In this case, the inductor coils can be connectable directly to the phases, assigned thereto, of the AC voltage line in parallel with the transformer.

Preferably, a compensation winding is assigned to each inductor coil of the star point reactor, wherein the compensation windings are arranged in an electrical series circuit between the neutral point and ground, wherein the compensation windings and the inductor coils have a common coil core. The impedance with respect to the fundamental frequency of the AC network can be further increased by virtue of the compensation windings. In this case, the number of turns per unit length of the compensation windings can be, for example, one third of the number of turns per unit length of the inductor coils. This embodiment of the invention has the advantage that the star point reactor has a comparatively low zero-sequence network impedance during normal operation and a high zero-sequence network impedance in the event of a fault on the DC-voltage side.

In some applications, it is advantageous if a transformer is arranged on the AC-voltage side of the converter. The transformer has windings on the power supply system side and on the converter side and connects the converter to an AC network on the power supply system side. The windings on the power supply system side can be arranged, for example, in a star arrangement, and the converter-side windings can be arranged, for example, in a delta or star arrangement. The neutral point of the converter-side star arrangement can be grounded. The direct current resulting from the asymmetry in the DC voltage circuit (also referred to as ground-fault current) can in this case cause disadvantageous premagnetization in the transformer.

In accordance with one embodiment of the invention, the inductor coils of the star point reactor are in the form of converter-side windings of the transformer, which is arranged on the AC-voltage side of the converter. The compensation windings are at the same time in the form of tertiary windings of the transformer, wherein a winding sense of the compensation windings is in the opposite direction to a winding sense of the assigned inductor coils, and the transformer and the star point reactor have a common coil core. The common coil core accordingly passes both through the windings on the power supply system side and on the converter side of the transformer and through the compensation windings. The resultant direct current in the converter arrangement flows, in accordance with this embodiment, distributed through the converter-side windings of the transformer and in totality through the compensation windings. A magnetic voltage produced in the coil core is compensated for by the oppositely oriented compensation windings. In this way, the previously described premagnetization of the transformer can advantageously be avoided. In addition, this effect results in a reduction in interference noise in the transformer.

In accordance with a further embodiment of the invention, the star point reactor is arranged between a transformer, which is arranged on the AC-voltage side of the converter, and the AC voltage connection of the converter, wherein a winding sense of the compensation windings and of the inductor coils is in the same direction. In accordance with this embodiment, the compensation windings form a series circuit, which is connected on one side to the neutral point of the star point reactor and on the other side to a connection to ground. The winding sense of each compensation winding is in the same direction as the winding sense of the assigned inductor coil. The advantages of this arrangement are a particularly high zero-sequence network impedance during normal operation and a low zero-sequence network impedance in the event of a fault on the DC-voltage side. In order to fix, in a targeted manner, the zero-sequence network inductance and the saturation point, air gaps can also be introduced here into each iron limb of the common coil core. In addition, the third harmonic in the AC voltage can be suppressed efficiently.

Preferably, the star point reactor has a switching unit, which is arranged between the compensation windings and ground or the connection to ground. The switching unit preferably comprises a parallel circuit comprising a resistance element and a switching element. The resistance element may be a nonlinear resistance element. The switching element expediently has bidirectional turn-off capability for direct currents, i.e. is suitably a bidirectional DC circuit breaker. During normal operation, the switching element can be closed. In the event of a ground fault in the DC voltage circuit (for example a lightning strike on an overhead line), the switching element can be opened. In this way, a corresponding fault current can be limited. In addition, a short decay time for the fault current can be achieved.

Preferably, the switching unit comprises at least one mechanical circuit breaker and/or at least one semiconductor switch. For example, the switching element can comprise IGBTs ("integrated gate bipolar transistors") known to a person skilled in the art, which form a so-called solid-state DC breaker. Alternatively or in combination, the switching element may be a correspondingly connected mechanical circuit breaker. The resistance element may be, for example, a nonlinear resistance element (surge arrester) with a sparkover voltage of from 50 kV to 100 kV.

Preferably, the star point reactor comprises a further surge arrester, which is connected in parallel with the compensation windings between the neutral point and ground. This surge arrester ensures voltage limitation in the event of a fault.

In accordance with a variant embodiment of the invention, each submodule has a full-bridge circuit having four power semiconductors capable of being turned off and an energy store, with the power semiconductors being interconnected with the energy store in such a way that an energy store voltage drop across the energy store, a zero-sequence voltage or else the inverse energy store voltage is capable of being generated at output terminals of the submodule.

In accordance with a further variant embodiment, each submodule has a half-bridge circuit having two power semiconductors capable of being turned off and an energy store, with the power semiconductors being interconnected with the energy store in such a way that an energy store voltage drop across the energy store or a zero-sequence voltage is capable of being generated at output terminals of the submodule.

In addition, it is conceivable for some of the submodules of the converter to be in the form of full-bridge circuits and others of the submodules to be in the form of half-bridge circuits.

It should be noted here that the application of the invention is not restricted to modular multi-level converters. It is conceivable, for example, for the submodules to each comprise a power semiconductor which can be turned on and off and a freewheeling diode connected back-to-back in parallel. In this case, the converter is in the form of a DC link converter, which has a DC voltage link in which a DC link capacitor is arranged.

The invention will be explained in more detail below with reference to exemplary embodiments illustrated in FIGS. 1 to 4.

DESCRIPTION OF THE INVENTION

Figure 1:
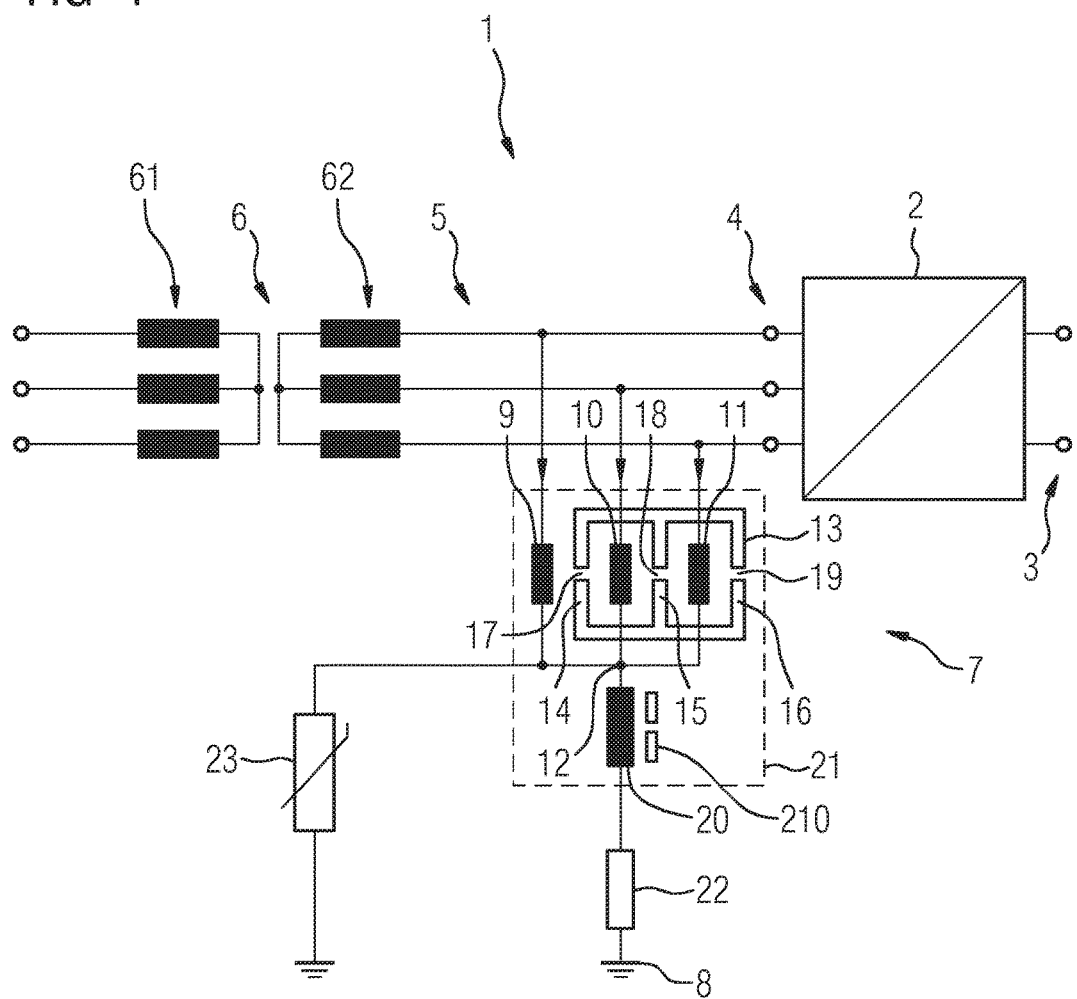
FIG. 1 shows a first exemplary embodiment of the converter arrangement according to the invention in a schematic illustration.

Specifically, FIG. 1 shows a converter arrangement 1. The converter arrangement 1 comprises a converter 2. The converter 2 has a DC-voltage side, which is connectable to a DC voltage circuit, for example a DC voltage link in an HVDC system or a DC voltage power supply system, by means of a DC voltage connection 3. In addition, the converter 2 has an AC-voltage side, which is connectable to an AC network 5 by means of AC voltage connection 4, said AC network being three-phase in the present example. In the exemplary embodiment illustrated in FIG. 1, the link to the AC network 5 takes place via a transformer 6. The transformer 6 comprises windings 61 on the power supply system side and windings 62 on the converter side on that side of the transformer 6 which faces the converter 2. Both the windings 61 on the power supply system side and the windings 62 on the converter side are each connected to one another in a star circuit.

In principle, however, any other suitable configuration of the transformer is also possible, for example a star-delta configuration.

A star point reactor 7 is arranged between the transformer 6 and the converter 2, said star point reactor being connected in parallel with the AC network 5, or between the phases of the AC network 5 and a connection to ground 8.

The star point reactor 7 comprises a first inductor coil 9, a second inductor coil 10 and a third inductor coil 11. Each inductor coil 9-11 is connected to a phase, assigned thereto, of the AC network 5. The inductor coils 9-11 are connected to one another to form a common neutral point 12 on the side remote from the AC network 5. The three inductor coils 9-11 have a common coil core 13. In this case, each inductor coil 9, 10 or 11 has a subcore 14, 15 or 16, respectively, of the common coil core 13 passing through it. Each subcore 14, 15 or 16 has an air gap 17, 18 or 19, respectively, whose function has already been described above.

A zero-sequence network inductor 20, which has a dedicated iron core 210 with an air gap, is arranged between the common neutral point 12 and the connection to ground or link to ground.

The inductor coils 9-11 and the zero-sequence network inductor 20 are arranged in a common housing 21, which provides, for example, oil insulation, $SF_6$ insulation, ester insulation or the like.

A resistance element 22, which serves the purpose of current limitation, is located in a series circuit with the zero-sequence network inductor 20. A surge arrester 23 for voltage limitation is arranged in parallel with the series circuit comprising the zero-sequence network inductor 20 and the resistance element 22.

Figure 2:
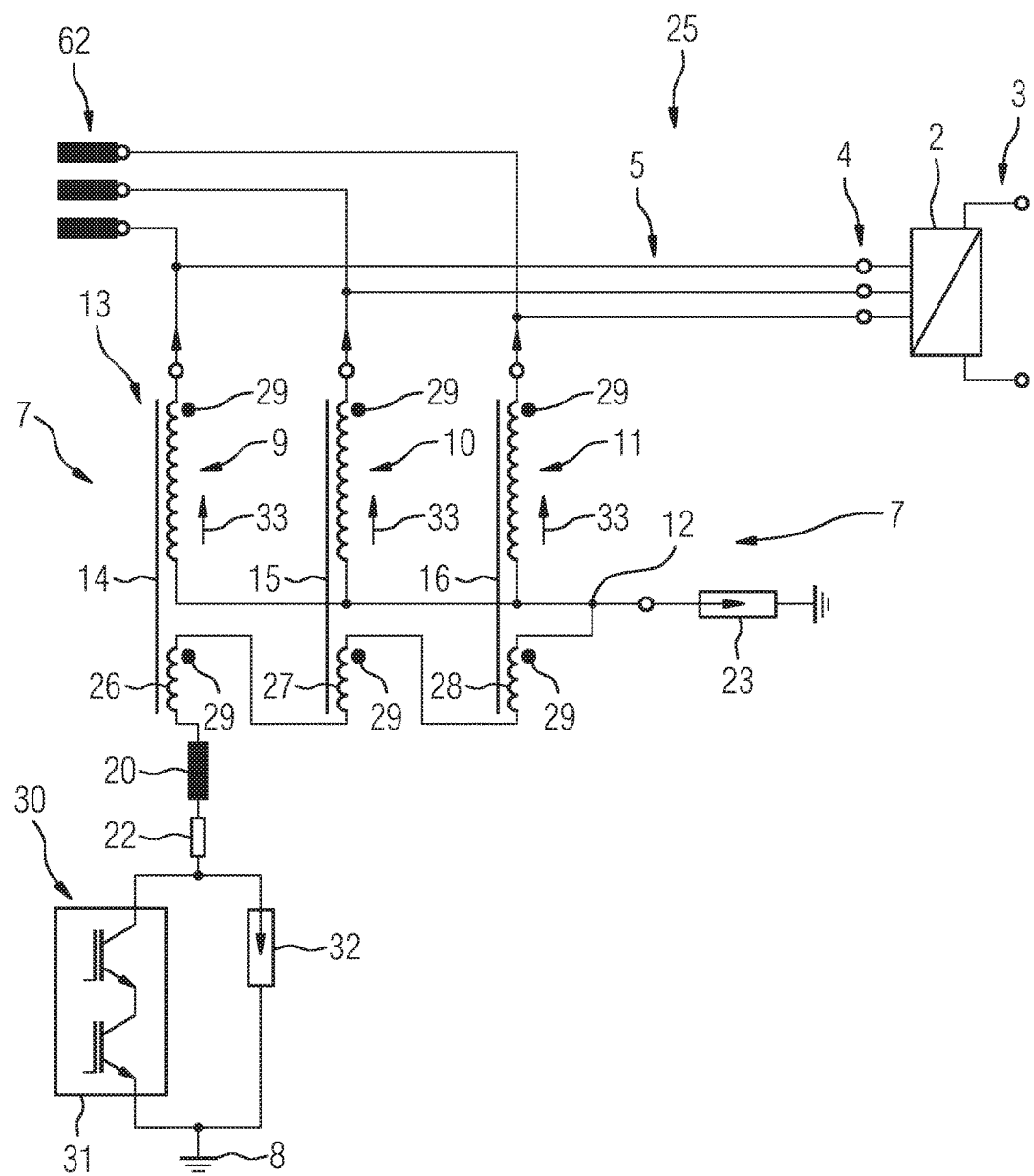
FIG. 2 shows a second exemplary embodiment of the converter arrangement according to the invention in a schematic illustration.

FIG. 2 shows a second exemplary embodiment of a converter arrangement 25. Identical or similar elements of the converter arrangements 1 and 25 have been provided with the same reference symbols in FIGS. 1 and 2, respectively. For reasons of clarity, the air gaps of the subcores 14-16 are not explicitly illustrated in the illustration in FIG. 2. The design of the coil core 13 in this case corresponds in principle to that of the coil core 13 from FIG. 1, however.

The converter arrangement 25 in FIG. 2 differs from the converter arrangement 1 in FIG. 1 in that a first compensation winding 26 is assigned to the first inductor coil 9, a second compensation winding 27 is assigned to the second inductor coil 10, and a third compensation winding 28 is assigned to the third inductor coil 11. The compensation windings 26-28 are arranged in a series circuit between the common neutral point 12 and the connection to ground 8. It can be seen that the common coil core 13 also passes through the compensation windings 26-28. The winding sense of the inductor coils 9-11 and of the compensation windings 26-28 is indicated in FIG. 2 by points 29. It can be seen that the winding sense of the compensation windings 26-28 is in the same direction as the winding sense of the inductor coils 9-11.

In addition, the converter arrangement 25 comprises a switching unit 30, which is arranged between the compensation windings 26-28 and the connection to ground 8. The switching unit 30 comprises a parallel circuit comprising a switching element 31 and a nonlinear resistance element 32. In the present exemplary embodiment, the switching element 31 is a solid-state breaker comprising a series circuit of a plurality of power semiconductor switches. The direction of the direct currents in the star point reactor 7 is indicated by arrows 33.

Figure 3:
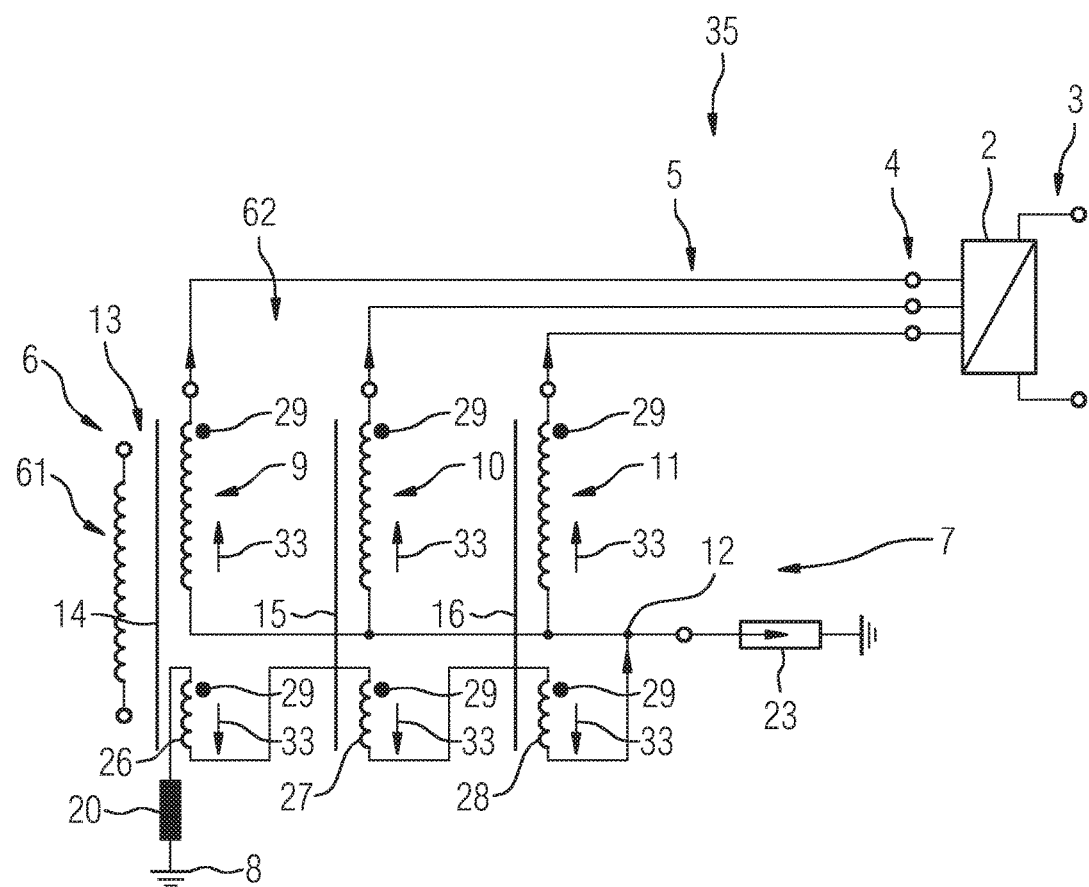
FIG. 3 shows a third exemplary embodiment of the converter arrangement according to the invention in a schematic illustration.

FIG. 3 shows a third exemplary embodiment of a converter arrangement 35. Identical or similar elements of the converter arrangements 1, 25 and 35 have been provided with the same reference symbols in FIGS. 1 and 2, respectively. For reasons of clarity, the air gaps in the subcores 14-16 are not explicitly illustrated in the illustration in FIG. 2. The design of the coil core 13 in this case corresponds in principle to that of the coil core 13 from FIG. 1, however. The inductor coils 9-11 of the converter arrangement 35 are embodied as the converter-side winding 62 of the transformer 6. For reasons of clarity, only one of the three windings 61, on the power supply system side, of the transformer 6 has been illustrated in the figure. However, it can be seen that the limbs or subcores 14-16 of the coil core 13 pass through both the inductor coils 9-11, the windings 61 on the power supply system side and the compensation windings 26-28. In contrast to the embodiment from FIG. 2, the winding sense of the compensation windings 26-28 of the converter arrangement 35 is in the opposite direction to the winding sense of the inductor coils 9-11. In this way, compensation of the magnetization of the coil core 13 is achieved, as a result of which premagnetization of the transformer 6 can be avoided. The corresponding direction of the resultant direct currents is indicated in FIG. 3 by the arrows 33.

Figure 4:
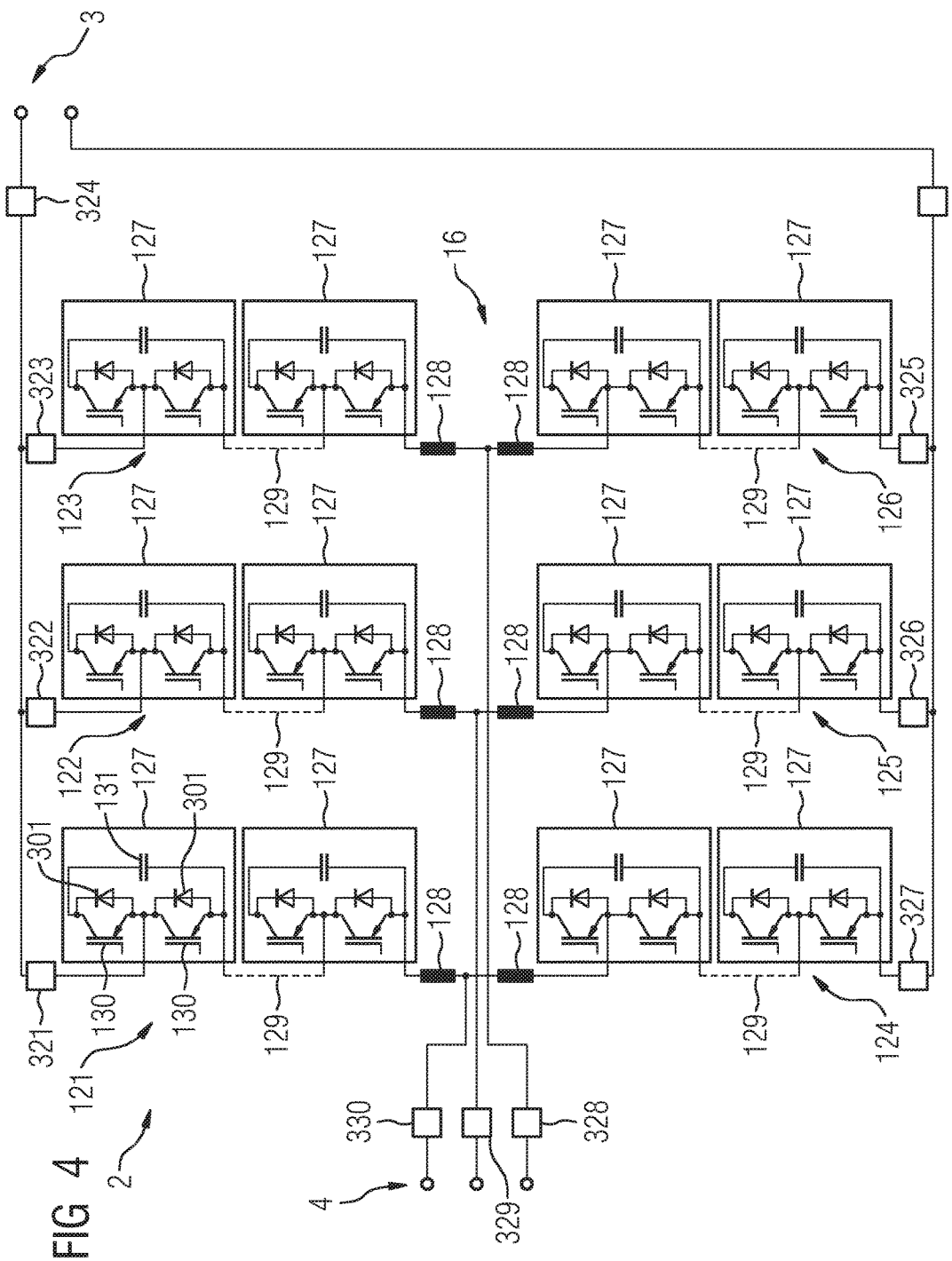
FIG. 4 shows an exemplary embodiment of a converter of the converter arrangement according to the invention in a schematic illustration.

FIG. 4 shows a converter 2 for one of the converter arrangements from FIGS. 1 to 3. The converter 2 is connected between an AC voltage connection 4 and a DC voltage connection 3. Therefore, the converter 2 is connectable on the DC-voltage side to a DC voltage line or a DC voltage power supply system and on the AC-voltage side to an AC network. The converter 2 is a modular multi-level converter (MMC). The MMC has power semiconductor valves 121-126 arranged between the DC-voltage side and the AC-voltage side.

Each power semiconductor valve 121-126 comprises a series circuit of two-pole submodules 127 and a smoothing inductor 128. In the exemplary embodiment illustrated in FIG. 2, all of the submodules 127 have an identical design, but this is not necessary in general. Interrupted lines 129 in FIG. 4 indicate that each power semiconductor valve 121-126 can have a greater number of submodules 127 than the two submodules 127 illustrated explicitly in FIG. 4.

Each submodule 127 comprises two semiconductor switches 130, with one freewheeling diode 301 being connected back-to-back in parallel with each of said semiconductor switches, and an energy store in the form of a capacitor 131. The submodules 127 are therefore in the form of half-bridge circuits. The semiconductor switches 130 of the submodules 127 are controllable independently of one another.

In place of the half-bridge circuits, the submodules can also be implemented, for example, as full-bridge circuits known to a person skilled in the art.

In addition, the converter 2 comprises measuring devices 321-300, which are designed for measuring currents and/or voltages.

In addition, a regulation unit for regulating the converter 2 is provided, but is not explicitly illustrated in FIG. 4.

The invention claimed is:

1. A converter arrangement, comprising:
a converter to be connected between an AC network and a DC voltage circuit;
said converter having a plurality of power semiconductor valves each extending between an AC voltage connection and a DC voltage connection;
each of said power semiconductor valves having a series circuit of two-pole submodules with power semiconductors;
a star point reactor connected connected between a transformer, which is arranged on the AC-voltage side of said converter, and the AC voltage connection of said converter said star point reactor having inductor coils interconnected to form a grounded neutral point and said inductor coils having a common coil core and wherein a winding sense of said compensation windings and of said inductor coils is in a same direction; and
a compensation winding assigned to each inductor coil of said star point reactor, wherein said compensation windings are arranged in an electrical series circuit between the neutral point and a link to ground, and wherein said compensation windings and said inductor coils have a common coil core; and
said star point reactor includes a switching unit connected between said compensation windings and the link to ground.

2. The converter arrangement according to claim 1, wherein each inductor coil of said inductor coils has a sub core, assigned thereto, of said common coil core passing through it, and wherein each sub core delimits an air gap, wherein said air gap is in each case dimensioned such that each inductor coil has a predetermined inductance and a predetermined saturation point given a preset converter direct current.

3. The converter arrangement according to claim 1, further comprising a zero-sequence network inductor connected between the neutral point and a link to ground.

4. The converter arrangement according to claim 1, wherein said star point reactor is connected between a transformer, which is arranged on the AC-voltage side of said converter, and the AC voltage connection of said converter.

5. The converter arrangement according to claim 1, wherein said inductor coils of said star point reactor are converter-side windings of a transformer, which is arranged on the AC-voltage side of said converter, and said compensation windings are tertiary windings of said transformer, wherein a winding sense of said compensation windings is in an opposite direction to a winding sense of the assigned said inductor coils, and wherein said transformer and said star point reactor have a common coil core.

6. The converter arrangement according to claim 1, wherein said switching unit comprises at least one mechanical circuit breaker and/or at least one semiconductor switch.

7. The converter arrangement according to claim 1, wherein said star point reactor comprises a surge arrester connected in parallel with said compensation windings between the neutral point and the link to ground.

8. The converter arrangement according to claim 1, wherein each of said submodules has a full-bridge circuit with four power semiconductors capable of being turned off and an energy storage device, with said power semiconductors being interconnected with said energy storage device to enable each of said submodules to generate a voltage drop across said energy storage device, a zero-sequence voltage, or else an inverse energy storage device voltage at output terminals of said submodule.

9. The converter arrangement according to claim 1, wherein each of said submodules has a half-bridge circuit with two power semiconductors capable of being turned off and an energy storage device, with the power semiconductors being interconnected with said energy storage device to enable each of said submodules to generate an energy storage device voltage drop across said energy storage device or a zero-sequence voltage at output terminals of said submodule.

* * * * *